Patented Mar. 10, 1942

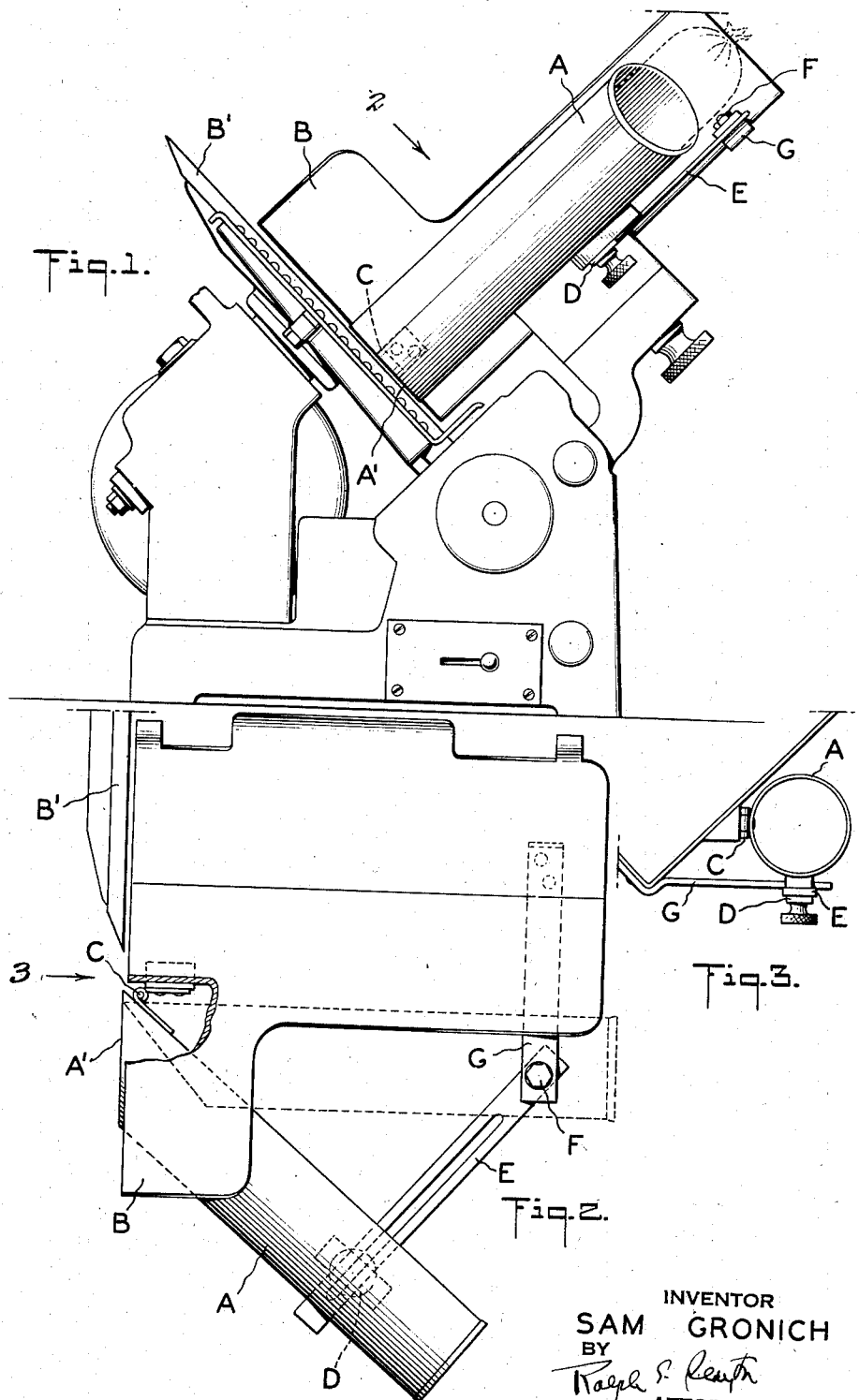

2,275,524

UNITED STATES PATENT OFFICE 2,275,524

AUXILIARY OBJECT FEEDING DEVICE FOR SLICING MACHINES

Sam Gronich, Los Angeles, Calif., assignor to Globe Slicing Machine Co. Inc., Stamford, Conn., a corporation of New York Application December 2, 1939, Serial No. 307,235

3 Claims. (Cl. 146—102)

This invention relates to devices for feeding objects in slicing machines and has more particular reference to devices more especially adaptable for conveniently feeding relatively small objects.

Relatively long, small objects, such as bologna and the like, are difficult and dangerous to cut in the conventional slicing machine because of their size and shape and because they are generally cut at an angle, whereas the larger meats are generally cut at right angles to their longitudinal axis.

To provide a simplified and efficient object holder for cutting these small objects at variable angles is one of the objects of this invention. Other objects will be become apparent as the description of the particular embodiments chosen to illustrate the invention progresses.

While one embodiment of this invention is illustrated in the accompanying drawing, it is to be understood that such embodiments merely serve as an illustration of the underlying principles of the invention so that it may be readily comprehended by those skilled in the art, and is not intended as limiting the invention to the specific details disclosed therein.

In said drawing:

Fig. 1 is an end elevation of the invention applied to the conventional slicing machine having an inclined feed chute, Fig. 2 is a view of Fig. 1 when viewed in the direction of the arrow 2, and Fig. 3 is a view of Fig. 2 when viewed in the direction of the arrow 3.

Continuing now by way of a more detailed description, an auxiliary object feeding chute A is shown with the conventional reciprocal object holder B of the gravity feed type of slicing machine having the usual rotary cutting knife B'. The auxiliary chute A is adjustably mounted on the reciprocable holder B preferably on one side thereof, although the invention also contemplates as an alternative feature the use of an inclined open ended adjustable feed chute in place of the usual object holder. The auxiliary chute may and preferably does take the form of a cylinder although an open ended holder of any suitable cross-sectional shape may also be used. The auxiliary chute A is pivotally secured by the hinge C at its biased discharge end A' to the reciprocable object holder A, the biased end and pivotal mounting affording means for tilting the object holder relatively to the plane of the cutting knife without interference therewith, while at the same time supporting the object near the cutting knife. A set screw D is mounted in any convenient manner on the auxiliary feed chute A to engage the slot of a slotted arm E pivotally mounted at F on a bracket G secured to the object holder B in any convenient manner.

By releasing the set screw D the auxiliary feed chute B may be swung about the hinge C to vary the feed angle of the auxiliary chute with respect to the plane of the cutting knife B', the end of the slot in the slotted arm E and set screw limiting the movement of the free end of the auxiliary chute so as to prevent the heel of the biased end from being thrown into the path of the knife.

What is claimed is:

1. A slicing machine combining a knife, a carrier reciprocable with respect to the knife having a V shaped platform for support thereon of objects to be guided to the knife, an open ended container beneath one side of the platform shaped to embrace and hold and to guide to the knife objects to be cut; said container having a biased end pivotally attached at a point beneath said side of the platform adjacent the plane of the knife, for angular adjustment of the container with respect to the knife; the pivot and adjustment means being arranged for swing of the container substantially parallel to the bottom of the platform beneath the side thereof, and the bias of the end of the container being such as to preclude projection of the container into the plane of the knife on angular adjustments of the container.

2. A slicing machine combining a knife, a carrier reciprocable with respect to the knife having a platform for support thereon of objects to be fed in a path to the knife, said platform having a side which extends lengthwise of said path of feed and which is inclined laterally thereto, auxiliary means shaped to embrace and to hold objects to be cut; said auxiliary means being pivoted to the carrier and having a substantial portion thereof beneath and within a lateral projection of said inclined side permitting of angularly adjusted positions thereof outside of the field for objects on the platform and having a biased end adjacent the plane of the knife, the bias of which end precludes projection of the auxiliary holder into the plane of the knife on said adjustments thereof, and means for securing the auxiliary holder in any one of said angular adjustments thereof outside of the field for objects on said platform.

3. A slicing machine combining a knife, a carrier reciprocable with respect to the knife having a platform for support thereon of objects to be fed to the knife, an auxiliary object holder which is pivotally connected at an end thereof to the carrier beneath said platform, to have a range of angular adjustment with respect to the knife; the point of said pivotal connection of the auxiliary holder being at a distance below the platform less than that of said range of angular adjustment thereof; and said connecting end of this auxiliary holder being biased to preclude projection thereof into the plane of the knife.

SAM GRONICH.